3,402,079
HIGH TEMPERATURE THERMOCOUPLE
Raymond L. Farrow, Westboro, Mass., assignor to the United States of America as represented by the Secretary of the Army
Filed July 21, 1965, Ser. No. 473,876
2 Claims. (Cl. 136—228)

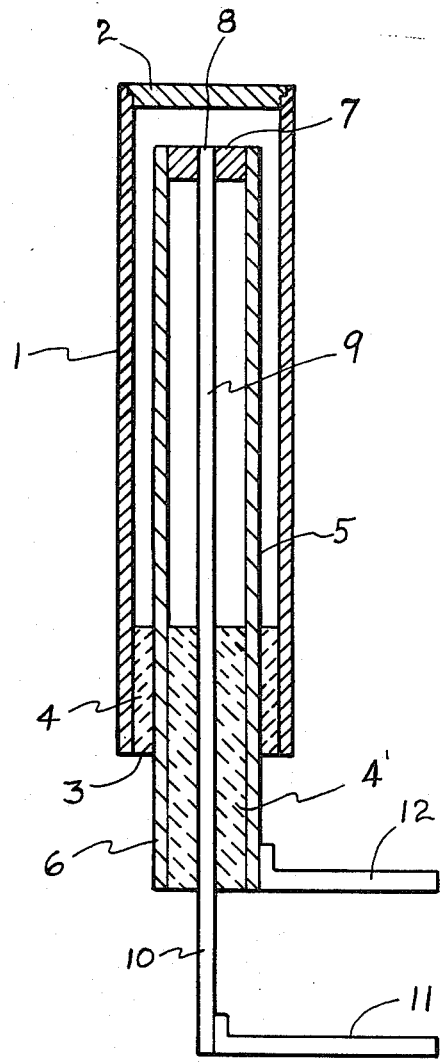

The invention described herein may be manufactured and used by or for the Government for governmental purposes, without the payment to me of any royalty thereon.

This invention relates to high temperature thermocouples capable of measuring accurately temperatures in excess of 5000° F.

Conventional high temperature thermocouples are limited to the capabilities of electric insulators which means a maximum temperature of approximately 4500° F. Further high temperatures also cause certain chemical reactions which limit the use of unsheathed thermocouples to a vacuum or highly inert atmospheres.

It is therefore the object of this invention to provide a thermocouple without electric insulators capable of measuring accurately temperatures in excess of 5000° F. and whose maximum temperature measurements will be limited only by the capabilities of the thermocouple legs.

One type of such a device is shown in the single view of the drawing in which is shown a cylindrical housing 1 of tantalum having a cap 2 of the same material welded to the top of the housing 1 in a high purity inert-gaseous atmosphere to eliminate all oxygen in the instrument. The opposite end 3 of the housing is closed by granular refractory material 4 such as alumina, beryllia or thoria. Within the housing 1 a tube 5 of tungsten and 26% rhenium is axially positioned with the bottom section 6 protruding through and beyond the refractory insulating material 4 of the housing, and also closed at the bottom with refractory material 4'. A junction block 7 of tungsten and 26% rhenium closes the tube 5 at the top and is provided with an interior recess 8 for the reception of a tungsten wire 9 which is maintained axially of the tube 5 and has a bottom or cooler portion 10 extending through and beyond the granular material 4' in the cool section 6 at the bottom of the tube 5. A copper lead wire 11 is attached to the cool section 10 of the wire 9 and another lead wire 12 is attached to the cool section 6 of the tube 5. Any suitable or convenient means may be connected to the lead wires 11 and 12 for measuring the potential developed at the junction block 7.

The junction block 7 is connected to both the wire 9 and the tube 5 by welding or otherwise fusing in a high purity inert-gas atmosphere to eliminate the presence of oxygen inside the instrument.

In the hot zone or the junction end of the thermocouple, the separation of the tungsten wire is maintained by the inherent rigidity of the junction block 7 and the tube 5. In the cooler zone the granular refractory material separates the housing, the tube and the wire for insulating purposes and maintains each from the other in spaced relationship.

The inherent rigidity of the tantalum housing at extreme temperatures eliminates the necessity for using insulators in the hot zone and gives the instrument the capability of measuring extreme temperatures and overcomes the disadvantages of instruments now employed using electric insulators.

What is claimed is:
1. A high temperature thermocouple to measure temperatures above 5000° F. comprising a cylindrical tantalum housing open at the bottom, an open ended tube of tungsten and 26% rhenium within the housing, a junction block closing said tube at the top and having an interior recess in the center, a tungsten wire positioned centrally with respect to said tube and fitted into said recess of the junction block, granular refractory material sealing the bottom of the housing and tube and maintaining the housing, tube and wire in spaced relationship and copper leads connected on the outside to said wire and to said tube for measuring the potential by any suitable means.

2. A high temperature thermocouple to measure temperatures above 5000° F. comprising, a tubular tantalum housing closed at the base with granular refractory material, said housing closed at the opposite end in an inert gaseous atmosphere with a tantalum end plate, a tube of tungsten and 26% rhenium within the housing and concentric therewith, said tube extending through and beyond the granular base of the housing and also closed at the bottom with granular refractory material, a junction block of tungsten and 26% rhenium closing said tube and having a centrally located recess on the interior thereof, a tungsten wire centered in the tube and secured in the recess of the junction block of the tube, said wire spaced from the walls of said tube and extending through and beyond the refractory material at the base of the tube, said tube insulated and maintained in spaced relationship by the refractory material at the base from the housing and the wire and copper leads connected on the outside to the wire and to the protruding portion of the tube for measuring the potential by any suitable means.

References Cited

UNITED STATES PATENTS

| 2,639,305 | 5/1953 | Wills | 136—228 |
| 3,097,973 | 7/1963 | Wieszeck | 136—234 |
| 3,329,534 | 7/1967 | Adler et al. | 136—233 |

ALLEN B. CURTIS, *Primary Examiner.*

M. ANDREWS, *Assistant Examiner.*